No. 728,413. PATENTED MAY 19, 1903.
W. H. REYNOLDS.
MECHANISM FOR COMPRESSING AIR OR OTHER GASES.
APPLICATION FILED DEC. 2, 1901.
NO MODEL. 2 SHEETS—SHEET 2.
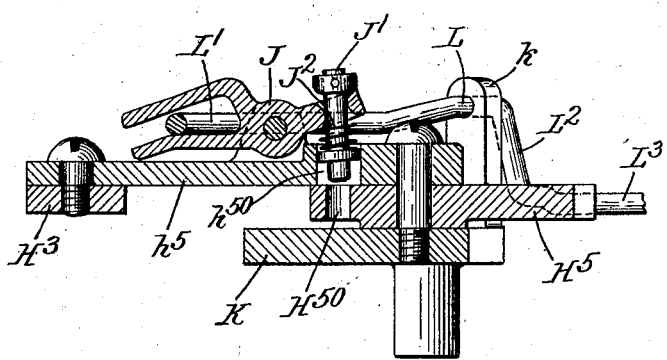
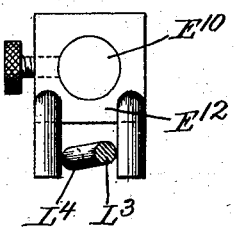
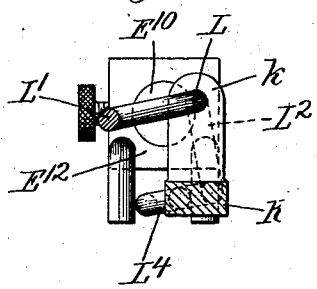
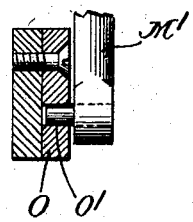
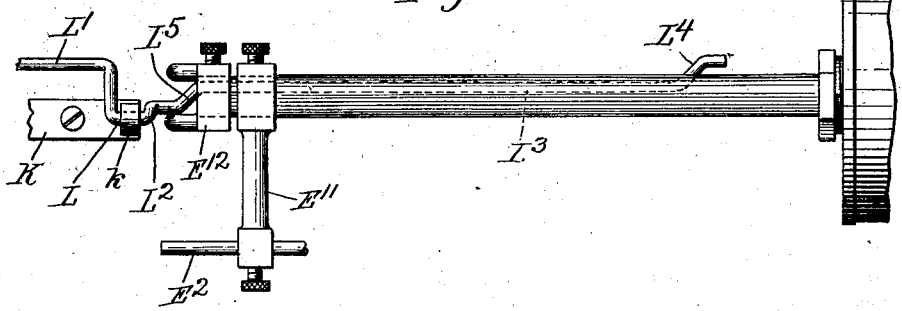
Witnesses.
Edward T. Wray.
Harold Warner.
Inventor.
Will H Reynolds
by Burton Burton
Attorney's.

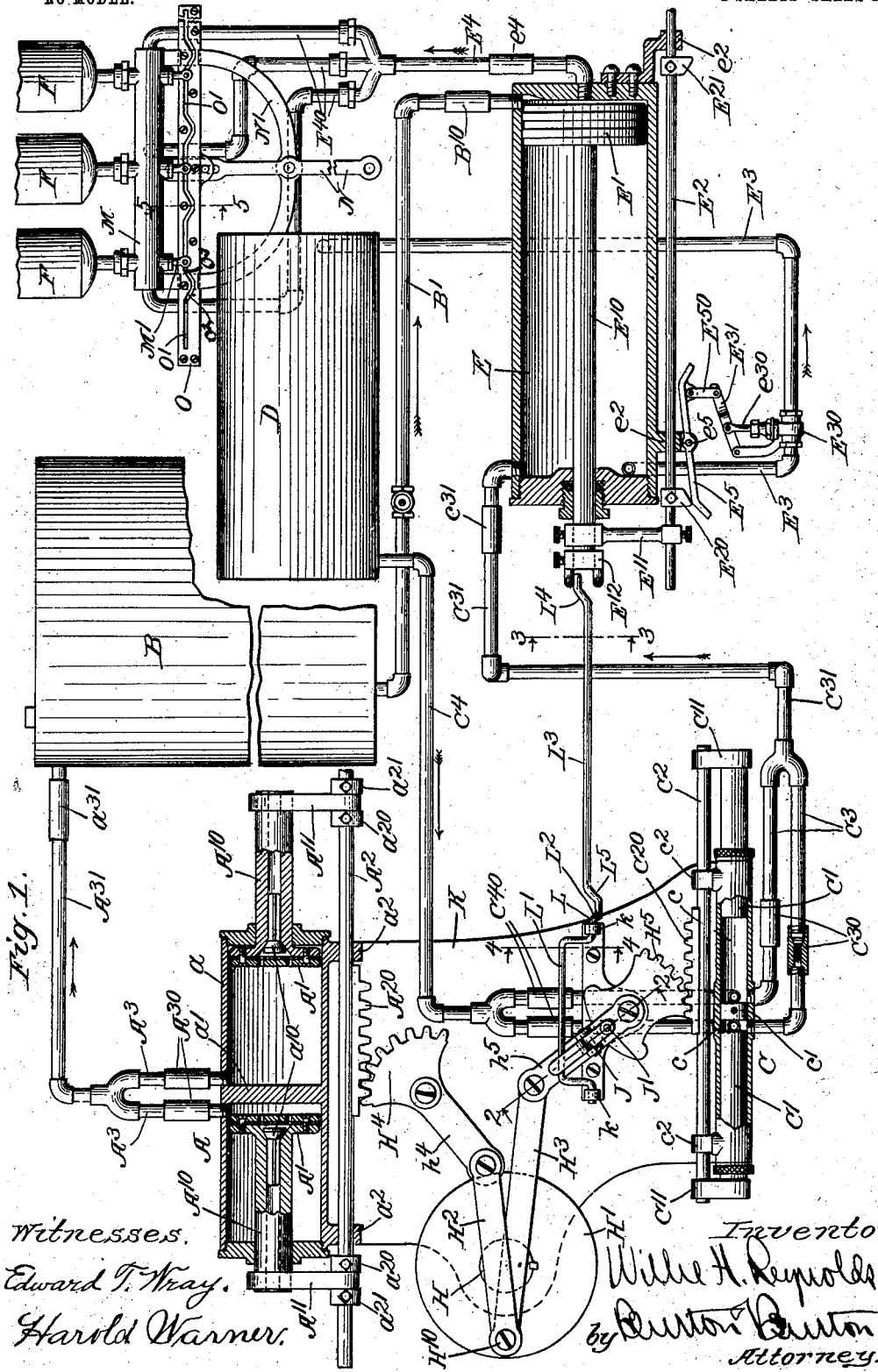

No. 728,413. Patented May 19, 1903.

UNITED STATES PATENT OFFICE.

WILLIE H. REYNOLDS, OF CHICAGO, ILLINOIS, ASSIGNOR TO THE M. AND P. CO. OF CHICAGO, OF CHICAGO, ILLINOIS, A CORPORATION OF ILLINOIS.

MECHANISM FOR COMPRESSING AIR OR OTHER GASES.

SPECIFICATION forming part of Letters Patent No. 728,413, dated May 19, 1903.

Application filed December 2, 1901. Serial No. 84,314. (No model.)

*To all whom it may concern:*

Be it known that I, WILLIE H. REYNOLDS, a citizen of the United States, residing at 372 East Ohio street, Chicago, Cook county, Illinois, have invented certain new and useful Improvements in Mechanism for Compressing Air or other Gases, of which the following is a specification, reference being had to the accompanying drawings, forming a part thereof.

This invention is designed to constitute an improved means for compressing air or any other gas to high tension; and it consists in the means shown and described by which a liquid is utilized to transmit the pressure derived from the motor to the gas compressed in the final stage—that is, to the higher tensions desired—as fully set out in the claims.

In the drawings, Figure 1 is a plan view of a complete apparatus embodying my invention, the several cylinders of the nature of pumps which are included in said apparatus being shown in an axial section and the deflection of certain pipes for connecting the different parts which is necessary to avoid other parts of the mechanism being disregarded, the view being somewhat in the nature of a diagram. Fig. 2 is a section at the line 2 2 on Fig. 1. Fig. 3 is a section at the line 3 3 on Fig. 1. Fig. 4 is a section at the line 4 4 on Fig. 1. Fig. 5 is a section at the line 5 5 on Fig. 1. Fig. 6 is a detail plan of the controlling connection between the high-tension engine and the force-pump which supplies it with water for pressure.

My apparatus comprises five (5) principal elements, as follows: first, a low-tension compressor for gas; second, a force-pump for liquid; third, a piston-chamber and a piston therein which receives and discharges gas at one side of the piston and liquid at the other side; fourth, a high-pressure storage-chamber for gas; fifth, a motor which actuates the low-tension compressor and the force-pump. It may comprise in addition to these five elements two further elements, to wit: sixth, a low-tension storage-chamber for gas, constituting the immediate receiver from the low-tension compressor, and, seventh, a liquid-reserve chamber from which the force-pump is supplied and into which the liquid returns after it is used as a medium for compressing the gas to high tension. These last two elements may under some circumstances be dispensed with, and the liquid-reserve chamber is in no case an absolute necessity and serves only the purpose of avoiding the waste of liquid, permitting it to be used over and over, and thus rendering it practicable to employ oil or glycerin or other liquid besides water for the purpose.

A is the low-tension gas-compressor, a double compressing-pump having two pistons $A'$ $A'$, which are reciprocated between the cylinder-heads and the mid-diaphragm $a'$ by means of their respective stems $A^{10} A^{10}$, which emerge through the opposite heads respectively and are connected by arms $A^{11} A^{11}$ to an exterior operating-rod $A^2$, which is mounted in lugs $a^2$ outside the cylinder $a$ and has intermediate the lugs rack $A^{20}$ for engagement of an operating device deriving movement from the primary motor.

The piston-stems $A^{10} A^{10}$ are hollow, and the intake is afforded through them, check-valves $a^{10} a^{10}$ being provided to retain the gas admitted. It will be understood that when operated in the open air, as illustrated, the gas compressed is atmospheric air; but I refer to this gas because the action would not be different if other gas were employed.

$A^3 A^3$ are the discharge-pipes leading from the two chambers, respectively, of the compressor and at opposite sides of and immediately adjacent to the mid-diaphragm $a'$.

$A^{30} A^{30}$ are suitable check-valves in these discharge-pipes to prevent the return of gas discharged through them. The two pipes merge in a single pipe $A^{31}$, which leads to the low-tension gas-chamber B, a check-valve $a^{31}$ being desirably interposed between the junction of the pipes $A^3 A^3$ and the entrance to the chamber B.

C is the liquid force-pump. Its construction is similar to that of the compressor A, having two chambers $c$ $c$, partitioned by a mid-diaphragm $c'$. In each chamber $c$ there is a piston $C'$, whose stem emerges through the head of the cylinder, both pistons being connected by their respective arms $C^{11} C^{11}$ with an operating-rod $C^2$, mounted outside of the cylinder in lugs $c^2$ and having intermediate said lugs a rack $C^{20}$ for the engagement of the operating device deriving movement from the primary motor. Each chamber has an intake for liquid immediately adjacent to the mid-partition $c'$, the liquid-supply pipes $C^4$ for such intake leading from any source of liquid, as the reserve liquid-chamber D, and having check-valves $C^{40}$ $C^{40}$ to prevent the return. Discharge from each chamber $i$ is provided also immediately adjacent to the mid-diaphragm $c'$, the discharge-pipes $C^3$ $C^3$ being each provided with a check-valve $C^{30}$ to prevent return to the chamber, and said pipes being merged in a single pipe $C^{31}$, which discharges into one end of the piston-chamber E, a check-valve $c^{31}$ being interposed preferably close to the chamber E to prevent return of liquid which may be delivered past said valve into said chamber. A pipe B' leads from the low-tension gas-storage chamber B into the end of the piston-chamber E opposite that into which the liquid-pipe $C^{31}$ discharges, a check-valve $B^{10}$ being interposed in said pipe as near as may be convenient to its discharge into the piston-chamber.

F F are high-tension gas-storage chambers which are supplied from the end of the piston-chamber E into which the pipe B' leads, such supply being conducted through the discharge-pipe $E^4$, leading from that end of the piston-chamber by way of branch pipes $E^{40}$ $E^{40}$, discharging into said high-tension storage-chambers, respectively, their respective discharges being controlled by independent cut-off valves in the body M, operated, as hereinafter described, to admit high-tension gas to one or other of said high-tension chambers at the will of the operator. From the same end of the piston-chamber E at which the liquid-supply pipe $C^{31}$ discharges into it a liquid-discharge pipe $E^3$ leads from it, discharging into the liquid-reserve chamber D when such chamber is employed. In said liquid-discharge pipe $E^3$, conveniently near to its connection with the chamber E, there is a controlling-valve $E^{30}$. This is illustrated in a gate-valve, because a valve of this form can be more conveniently operated and more perfectly controls the passage of liquid than other forms. This valve is operated automatically, but not as a check-valve, being opened and closed, as hereinafter described, by mechanism connected with the piston which plays in the chamber E. E' is said piston. Its stem $E^{10}$ emerges through one end of the cylinder E, and the piston is arranged to reciprocate substantially to the opposite end. An arm $E^{11}$, attached to said piston-stem $E^{10}$, carries a rod $E^2$, which is guided in lugs $e^2$ $e^2$ outside the cylinder and reciprocated with the piston. This rod has tappets $E^{20}$ $E^{21}$ for operating the lever $E^5$, fulcrumed on the stud $e^5$, which juts from the cylinder. The ends of this lever $E^5$ are formed as cams to be encountered by the tappets as the rod $E^2$ reciprocates toward the limit of its movement in opposite directions, respectively, and the lever is thereby given the necessary movement to cause it, by means of a link $E^{50}$, with which it is provided, to actuate the lever $E^{31}$, to which the stem $e^{30}$ of the gate-valve is connected. The cam ends of the lever $E^5$ are formed suitably to cause the encounter of the tappets to open and close the valve with the prompt movement necessary for the result desired, as hereinafter more particularly explained. The primary motor may be of any type and may employ any form of energy. I have shown only its main shaft and the connections by which it actuates the low-tension gas-compressor and the liquid force-pump. H is said main shaft.

H' may represent a fly-wheel disk at the end of the shaft having a crank wrist or stud $H^{10}$, to which are connected the pitmen $H^2$ $H^3$. The pitman $H^2$ is connected at the other end to the lever-arm $h^4$ of the gear-segment $H^4$, said segment being suitably fulcrumed at its center and engaged with the rack $A^{20}$ on the rod $A^2$ to actuate the piston in the low-tension compressor A. The pitman $H^3$ is connected to the lever $h^5$, which is fulcrumed at the center of the gear-segment $H^5$, which engages the rack $C^{20}$ to operate the liquid force-pump.

K represents a frame structure on which the segment-gears $H^4$ and $H^5$ are fulcrumed and the compressor and force-pump are mounted or with which they are in any event rigidly connected, the bearings of the shaft H being also in the same frame structure. It may be understood that this representation is in a sense conventional or diagrammatic, designed to indicate merely the fixedness of relative position of the parts thus shown as mounted on the same rigid frame. The lever $h^5$ operates as an arm of the gear-segment $H^5$ when it is pinned thereto, and for the purpose of thus connecting the two parts a latch J is provided mounted on the lever $h^5$ and having a stud or tooth J', which is thrust through the hole $h^{50}$ in the lever and adapted to enter a hole $H^{50}$ in the gear-segment when the the two holes register. A spring $J^2$ may be provided, connected in any desirable or convenient way with the latch, tending to thrust the tooth thereof into the hole $H^{50}$ when said hole is opposite the tooth and to hold the latch in such a position, locking the lever to the segment until the latch is actuated to withdraw the tooth. On the frame K, I mount a rock-shaft L, which is cranked between its bearings $k$ $k$, so as to overhang the entire path of oscillation of the lever $h^5$ and engage the latch J, so that as the shaft is rocked its offset portion or wrist L' operates on the latch to force it down at the end pressed upon and up at the end having the tooth to withdraw the tooth from the engagement with the segment-gear $H^5$. The rock-shaft L extends beyond its bearings toward the cylinder E, being offset or cranked at $L^2$, near its bearing $k$, and again at $L^5$, and then extending parallel with the path of the piston $E^{10}$ for a distance nearly equal to the stroke of the piston, the distance between the cylinder E and the bearing $k$ of said rock-shaft being such that the end of the offset portion of said rock-shaft beyond the portion parallel with the piston's path extends by the end of the piston-stem when the latter is at the gas-discharging end of its stroke. The end of the piston carries a forked tappet $E^{12}$, which is in position to encounter the end of the rock-shaft L, said end portion being deflected to form a cam $L^4$. The forked tappet $E^{12}$ strides the offset portion $L^3$ of the rock-shaft L, and one fork encounters the cam portion $L^4$ at the inner limit of the piston's stroke, rocking the shaft in the direction to disengage the latch J, while the other prong of the fork encounters the cam $L^5$ at the opposite limit of the piston-stroke, rocking the shaft in the opposite direction and causing the latch to engage the gear-segment $H^5$. The force-pump is thus operated while the piston E' is moving inward in the cylinder E—that is, toward the end remote from the force-pump—and said pump is out of action from the time the piston reaches the inward limit of its travel, both while it may stand at rest at that limit and while it is returning to the other end of the cylinder, causing the gas to be drawn into the cylinder from the low-pressure reservoir B.

The pipes $E^{40}$ $E^{40}$ $E^{40}$, discharging into the high-tension gas-storage chambers, are controlled by independent valves, which, however, for convenience are formed with their bodies integral, such united bodies constituting a continuous bar M, on which there is mounted the bracket N', which supports the lever N, pivoted thereto and operating the cam-plate O, which is provided with slide-bearings on the bar M and has a cam-slot O', engaging the studs projecting from the valve-stems M' M' M', respectively, to open and close said valves as the cam-plate is moved longitudinally. The said cam-slot is formed with similar lateral deflections $O^2$ $O^3$ from their general course, constituting, in effect, a succession of similar cams having their corresponding points at distances from each other less than the distances between the valve-stems, respectively, the difference being substantially the distance necessary to open the valve, so that as the plate is moved continuously from the position at which all the valves are closed, as shown in Fig. 1, the valves are opened successively, each valve being closed after having been opened before the next one is opened, so that by swinging the lever N about its fulcrum in either direction away from the position shown in Fig. 1 the gas is admitted to the three chambers F F F successively, commencing at the end away from which the handle of the lever is rocked and to only one at a time.

The operation of this apparatus is designed to be as follows: The motor being operated continuously gives continuous operation to the low-tension gas-compressor, causing the gas compressed therein to be forced continuously into the low-tension gas-receiver B; wherein it is designed to be accumulated up to some convenient low tension—say one hundred pounds pressure. When this desired maximum (which approximately is also the minimum) has been obtained, the gas at this pressure will be admitted to the piston-chamber E, whose piston will have been up to that time standing at the end of the cylinder remote from the liquid force-pump, so that the latter has been out of action after first having acted long enough to once fill said piston-chamber and force the piston therein to the said remote position. The admission of gas of one hundred pounds' tension to the gas-receiving end of the chamber E will drive the piston back to the opposite end, causing it to force the liquid out of the chamber into the reserve liquid-chamber D. Upon reaching the limit of its movement toward the force-pump the tappet $E^{21}$, operating on the lever $E^5$, closes the valve $E^{30}$, preventing further discharge of water into the chamber D, the described action of the tappet $E^{12}$, on the cam $L^5$, engages the gear segment $H^5$ with the motor, and the force-pump resumes its action and again fills the chamber E, forcing back the piston E', discharging the gas at an increased tension into whichever of the high-tension chambers is at that time in communication with the pipe $E^4$, and at the end of such forcing stroke the tappet $E^{20}$, encountering the lever $E^5$, opens the valve $E^{30}$, and the pressure from the chamber B, operating again against the piston E', drives it back, forcing out the water through the open valve into the reservoir D. These operations follow each other automatically in the order indicated as long as the motor continues to operate until the tension in the high-pressure chamber which is in communication with pipe $E^4$ equals the full capacity of the system to produce tension. The operator in attendance will, at the proper time before the limit of such action is reached, operate the lever N to shift the valve-operating cam-bar O, so as to close the valve leading to the chamber which has been receiving the gas and open another chamber, which will be filled in like manner. The chamber E will be alternately filled with the gas from one and with the liquid from the other end, the gas being by the entrance of the liquid discharged into the high-pressure chamber, in which the pressure will increase with each successive action, requiring as it increases a greater force to be exercised by the liquid force-pump in filling the chamber E to force the piston to compress the gas to the tension necessary to drive it past the check-valve $e^4$ into the high-tension chamber. The reciprocations of the force-pump piston are as many times more frequent than those of the piston E' as the capacity of the cylinder E is greater than the volume of water thrown at each reciprocation of the force-pump piston. The area of the pistons of the liquid force-pump is sufficiently small to adapt the pump to operate under a limited force supplied through the motor-shaft to compress the gas up to a desired maximum tension of, say, two thousand pounds. In the apparatus which I have used, the area of the force-pump piston being about one-half a square inch and the lever $h^5$ being about double the radius of the gear-segment $H^5$, a pull of five hundred pounds exerted on the end of said lever by its connection with the motor-shaft is sufficient to produce the maximum compression. It will be noticed that this maximum requirement is only reached at the limit of the compression-stroke of the piston E', and at the commencement of each stroke from the first to the last in the entire process the piston operates only against the gas at the tension of one hundred pounds or whatever is fixed upon as the tension to be maintained in the chamber B.

The use of a liquid to transmit mechanical force from the motor to the piston which compresses the gas in the chamber E has the advantage of dispensing largely with packing for the piston and reduces the operating parts, and the constant succession of change from gas to liquid in the chamber E keeps the chamber cool, the liquid carrying off the heat generated in the compression of the gas, and this without any special expedient for the purpose causes the gas to reach the high tension in the chambers F without reaching a high temperature or heating the chambers or passages to a high temperature.

The relation between the action of the initial or the low-tension compressor and the liquid force-pump will determine the tension at which gas is maintained in the chamber B, and this may be regulated at will by varying the relative lengths of the strokes of the pistons in the gas-compressor E' and the force-pump. Such variation at will may be made by adjusting the stop-collars $a^{20}$ and $a^{21}$ on the rod $A^2$ so as to allow more or less play to said rod—that is, movement in which it will not carry the pistons A' A'.

I claim—

1. A gas-compressing mechanism comprising a gas-compressing pump, a liquid force-pump, a high-pressure storage-chamber for compressed gas, a piston-chamber and a piston therein, said piston-chamber having at one side of the piston an inlet from the gas-compressor and an outlet to the high-pressure chamber and valves controlling the same, and having at the other side of the piston an inlet from the liquid force-pump, and an outlet both provided with check-valves, and means for operating the compressor and the force-pump.

2. A mechanism for compressing gas to a high tension comprising a gas-compressor, a low-pressure chamber into which it discharges, a liquid force-pump, a high-pressure gas-storage chamber, a piston-chamber and a piston therein, said piston-chamber having at one side of the piston an inlet from the low-pressure gas-chamber and an outlet to the high-pressure gas-chamber, and valves controlling said inlet and outlet respectively, and at the other side an inlet from the force-pump, and an outlet and check-valves controlling said inlet and outlet respectively.

3. A mechanism for compressing gas to a high tension comprising a gas-compressor and a liquid force-pump and a liquid-holder from which it is supplied, a high-pressure gas-storage chamber, a piston-chamber and a piston therein, the piston-chamber having at one side of the piston an inlet from the gas-compressor and an outlet to the high-pressure chamber, and at the other side of the piston an inlet from the liquid force-pump and an outlet to the liquid-holder.

4. A mechanism for compressing gas to a high tension comprising a gas-compressor, a low-pressure gas-chamber into which it discharges, a liquid force-pump and a liquid-holder from which it is supplied, a high-pressure gas-storage chamber, a piston-chamber and a piston therein, the piston-chamber having at one side of the piston an inlet from the low-pressure gas-chamber and an outlet to the high-pressure gas-chamber, and at the other side an inlet from the force-pump and an outlet to the liquid-chamber.

5. A mechanism for compressing gas to a high tension comprising a gas-compressor and liquid force-pump, a high-pressure gas-storage chamber, a piston-chamber and a piston therein, said piston-chamber having at one side of the piston an inlet from the gas-compressor and an outlet to the high-pressure chamber and at the other side of the piston an inlet from the liquid force-pump and an outlet, and means by which the piston at the ends of its stroke toward the liquid inlet and outlet connects the liquid force-pump with operating mechanism, and at the other ends of its stroke disconnects the same.

6. A gas-compressing mechanism comprising a low-tension gas-compressor, a liquid force-pump, a high-pressure storage-chamber for compressed gas, a chamber which receives at one end the gas from the low-tension compressor and at the other end liquid from the force-pump, said chamber having a liquid-discharge pipe from the end at which it receives the liquid, and a gas-discharge pipe from the end at which it receives the gas; a valve in the liquid-discharge pipe and means for opening and closing the same connected with and actuated by the piston, arranged to open said valve at the limit of the stroke of the piston toward the liquid-discharge end, and to close it at the limit of its stroke in the opposite direction.

7. In combination with a chamber receiving liquid at one end and gas at the other end, and having a piston playing between the liquid and gas inlets, a liquid-discharge pipe leading from the liquid-receiving end, and a gas-discharge pipe leading from the gas-receiving end, a check-valve in the gas-discharge pipe to prevent return to the gas-chamber, and a cut-off valve in the liquid-discharge pipe, mechanism for operating the cut-off valve to open and close the same, a rod reciprocated with the piston outside the chamber, and tappets on said rod for actuating the valve of the opening and closing device, said tappets being adjustable on the rod to vary the point in the piston-stroke at which the said valve is opened and closed.

8. In a gas-compressing mechanism comprising a low-tension gas-compressor, a liquid force-pump and a liquid and gas receiving chamber provided with a piston, into which chamber the compressor and pump discharge at opposite sides of the piston, means for actuating the compressor and pump comprising a motor-shaft, two pitman-links reciprocated by the shaft, connections by which said pitman-links operate the pistons in the compressor and pump respectively, and means operated by the piston of the chamber into which they discharge for disconnecting the pump mechanism at intervals to permit the said chamber to receive gas from the compressor.

9. In combination with the compressor and liquid force-pump, and means for actuating them comprising a gear-segment and coöperating rack to actuate the pistons of the pump, a lever-arm pivoted at the center of the segment and a latch for connecting it to the latter, a rock-shaft, L, having an offset overhanging the latch, and having the offset cam portions $L^2$ and $L^4$, the chamber which receives the gas and liquid from the compressor and pump respectively and the piston therein, the piston-stem having the tappet $E^{12}$, located and constructed to encounter said cam portions of the rock-shaft to cause the latter to operate the latch at the limits of the piston-stroke.

In testimony whereof I have hereunto set my hand in the presence of two witnesses, at Chicago, Illinois, this 31st day of October, A. D. 1901.

WILLIE H. REYNOLDS.

In presence of—
  EDWARD T. WRAY,
  HAROLD WARNER.